United States Patent
Peng (10) Patent No.: US 7,749,924 B2
(45) Date of Patent: Jul. 6, 2010

(54) THERMOPLASTIC ROOFING MEMBRANES (75) Inventor: Richard Peng, Fishers, IN (US)

(73) Assignee: BFS Diversified Products, LLC

( * ) Notice: Subject to any disclaimer, the term of this patent is extended or adjusted under 35 U.S.C. 154(b) by 0 days.

(21) Appl. No.: 11/991,231

(22) PCT Filed: Aug. 29, 2006

(86) PCT No.: PCT/US2006/033522

§ 371 (c)(1),
(2), (4) Date: Jan. 12, 2009

(87) PCT Pub. No.: WO2007/027602

PCT Pub. Date: Mar. 8, 2007

(65) Prior Publication Data

US 2009/0137168 A1    May 28, 2009

Related U.S. Application Data (60) Provisional application No. 60/712,070, filed on Aug. 29, 2005, provisional application No. 60/774,349, filed on Feb. 17, 2006, provisional application No. 60/775,128, filed on Feb. 21, 2006, provisional application No. 60/800,110, filed on May 12, 2006, provisional application No. 60/801,450, filed on May 18, 2006.

(51) Int. Cl.
*B32B 27/12* (2006.01)
(52) U.S. Cl. ........................................................ 442/38
(58) Field of Classification Search .................... 442/38
See application file for complete search history.

(56) References Cited

U.S. PATENT DOCUMENTS

| | | | |
|---|---|---|---|
| 3,230,127 | A | 1/1966 | Cleereman et al. |
| 3,397,428 | A | 8/1968 | Donald |
| 3,449,187 | A | 6/1969 | Bobkowicz |
| 3,726,754 | A | 4/1973 | Coglianese et al. |
| 3,962,018 | A | 6/1976 | Costemalle et al. |
| 4,183,777 | A | 1/1980 | Summers et al. |
| 4,392,897 | A | 7/1983 | Herrington |
| 4,808,482 | A | 2/1989 | Benge et al. |
| 5,002,624 | A | 3/1991 | Howell et al. |
| 5,006,383 | A | 4/1991 | Achille et al. |
| 5,137,675 | A | 8/1992 | Rabe |
| 5,226,392 | A | 7/1993 | Breuer et al. |

(Continued)

FOREIGN PATENT DOCUMENTS

DE    19915314 A1    10/2000

(Continued)

OTHER PUBLICATIONS

Wu, R.-Y, et al., "Tearing resistance of multi-layer plastic films", International Journal of Fracture 68: Jun. 1994, pp. 141-150, Kluwer Academic Publishers, Netherlands 1994.

(Continued)

*Primary Examiner*—Ula C Ruddock
(74) *Attorney, Agent, or Firm*—Thomas R. Kingsbury; Arthur Reginelli (57) ABSTRACT

A membrane comprising at least one polymeric layer including i) a plastomer, ii) a low density polyethylene, iii) a propylene-based polymer, and optionally iv) flame retardant.

26 Claims, 3 Drawing Sheets

U.S. PATENT DOCUMENTS

| | | | |
|---|---|---|---|
| 5,266,392 A | 11/1993 | Land et al. |
| 5,473,016 A | 12/1995 | Fujii et al. |
| 5,486,249 A | 1/1996 | Valaitis et al. |
| 5,494,429 A | 2/1996 | Wilson et al. |
| 5,573,092 A | 11/1996 | Gabilondo |
| 5,747,592 A | 5/1998 | Huff et al. |
| 5,798,413 A | 8/1998 | Spelthann et al. |
| 5,891,563 A | 4/1999 | Letts |
| 6,044,604 A | 4/2000 | Clayton et al. |
| 6,117,375 A | 9/2000 | Garrett et al. |
| 6,117,541 A | 9/2000 | Frisk |
| 6,207,754 B1 | 3/2001 | Yu |
| 6,253,528 B1 | 7/2001 | Hubbard et al. |
| 6,284,183 B1 | 9/2001 | Roys et al. |
| 6,308,482 B1 | 10/2001 | Strait |
| 6,372,811 B2 | 4/2002 | Singh et al. |
| 6,376,039 B1 | 4/2002 | Skärin |
| 6,394,166 B2 | 5/2002 | Hubbard et al. |
| 6,451,897 B1 | 9/2002 | Niyogi |
| 6,506,842 B1 | 1/2003 | Heck et al. |
| 6,544,909 B1 | 4/2003 | Venkataswamy et al. |
| 6,607,793 B2 | 8/2003 | Hubbard et al. |
| 6,645,336 B1 | 11/2003 | Albertone et al. |
| 6,764,968 B1 | 7/2004 | Hindi et al. |
| 6,774,071 B2 | 8/2004 | Horner et al. |
| 6,864,194 B2 | 3/2005 | Hindi et al. |
| 6,864,195 B2 | 3/2005 | Hindi et al. |
| 7,387,753 B2 | 6/2008 | Tackett |
| 2001/0003625 A1 | 6/2001 | Apgar et al. |
| 2002/0127933 A1 | 9/2002 | Baccus et al. |
| 2002/0187693 A1 | 12/2002 | Cherry |
| 2003/0082365 A1 | 5/2003 | Geary et al. |
| 2003/0153656 A1 | 8/2003 | Sjerps |
| 2003/0198813 A1 | 10/2003 | Howell |
| 2004/0000746 A1 | 1/2004 | Montagna et al. |
| 2004/0087674 A1 | 5/2004 | Letts |
| 2004/0102537 A1 | 5/2004 | Letts et al. |
| 2004/0109983 A1 | 6/2004 | Rotter et al. |
| 2004/0242778 A1 | 12/2004 | Etherton |
| 2005/0031839 A1 | 2/2005 | Mizutani et al. |
| 2005/0032959 A1 | 2/2005 | Cheung et al. |
| 2005/0053746 A1 | 3/2005 | Bartek |
| 2005/0055975 A1 | 3/2005 | Tackett et al. |
| 2005/0106965 A1 | 5/2005 | Wevers et al. |
| 2005/0170720 A1 | 8/2005 | Christiansen et al. |
| 2006/0046084 A1 | 3/2006 | Yang et al. |
| 2006/0179749 A1 | 8/2006 | Brandt et al. |
| 2007/0193167 A1 | 8/2007 | Bruce et al. |
| 2007/0194482 A1 | 8/2007 | Douglas et al. |
| 2007/0295467 A1 | 12/2007 | Grass et al. |
| 2009/0181216 A1 | 7/2009 | Peng |

FOREIGN PATENT DOCUMENTS

| | | |
|---|---|---|
| DE | 101 20620 A1 | 10/2002 |
| EP | 0458520 A2 | 11/1991 |
| EP | 0816069 A2 | 1/1998 |
| EP | 1063345 A2 | 12/2000 |
| EP | 1 108 598 A2 | 6/2001 |
| EP | 1 108 599 A2 | 6/2001 |
| EP | 1236769 A1 | 9/2002 |
| EP | 1672021 A1 | 6/2006 |
| JP | 2001241118 A | 9/2001 |
| WO | WO 99/01504 A1 | 1/1999 |
| WO | WO 0023509 A1 | 4/2000 |
| WO | WO 00/76862 A1 | 12/2000 |
| WO | WO 01/23184 A1 | 4/2001 |
| WO | WO 02/075071 A1 | 9/2002 |
| WO | WO 2005113668 A1 | 12/2005 |
| WO | WO 2006/014583 A1 | 2/2006 |
| WO | WO 2006/033983 A1 | 3/2006 |
| WO | WO 2006/105273 A1 | 10/2006 |
| WO | WO 2007027602 A1 | 3/2007 |

OTHER PUBLICATIONS

U.S. Appl. No. 12/301,377, filed Dec. 11, 2008, Peng, "Polymeric Laminates Including Nanoclay."

THERMOPLASTIC ROOFING MEMBRANES

This application is a §371 application of PCT/2006/033522 filed Aug. 29, 2006, which claims the benefit of U.S. Provisional Application No. 60/712,070, filed Aug. 29, 2005, U.S. Provisional Application No. 60/774,349, filed Feb. 17, 2006, U.S. Provisional Application No. 60/775,128, filed Feb. 21, 2006, U.S. Provisional Application No. 60/800,110, filed May 12, 2006, and U.S. Provisional Application No. 60/801,450, filed May 18, 2006, which are incorporated herein by reference.

FIELD OF THE INVENTION

One or more embodiments of this invention are directed toward thermoplastic roofing membranes.

BACKGROUND OF THE INVENTION

Polymeric roofing membranes have been employed to cover flat or low-sloped roofs. Both thermoset and thermoplastic membranes have been employed. One type of thermoplastic membrane includes olefin-based thermoplastic resins. It is believed that one commercial source of an olefin-based resin employed in these membranes includes blends of thermoplastic resins that are prepared in situ or in sequence. In other words, the blends are believed to be formed during synthesis of the thermoplastic resins.

SUMMARY OF THE INVENTION

One or more embodiments of the present invention provide a membrane comprising at least one polymeric layer including i) a plastomer, ii) a low density polyethylene, iii) a propylene-based polymer, and optionally iv) flame retardant.

One or more embodiments of the present invention also provide a membrane comprising at least one polymeric layer including (i) a plastomer, (ii) a low density polyethylene, and (iii) a propylene-based polymer, where the polymeric sheet includes at least 31% by weight of the low density polyethylene based upon the total weight of the plastomer, low density polyethylene, and propylene-based polymer.

One or more embodiments of the present invention further provide a membrane comprising at least one polymeric layer including (i) a plastomer, (ii) a low density polyethylene, and (iii) a propylene-based polymer, where the polymeric sheet is substantially devoid of a rubber.

One or more embodiments of the present invention also provide a membrane comprising at least one polymeric layer including (i) a plastomer, (ii) a low density polyethylene, and (iii) a propylene-based polymer, where the low density polyethylene includes a linear low density polyethylene including one or more mer units deriving from butane-1, pentene-1, hexane-1, octane-1, or 4-methyl-pentene-1.

On or more embodiments of the present invention further provide a multi-layered membrane comprising a first polymeric layer including (i) a plastomer, (ii) a low density polyethylene, (iii) a propylene-based polymer, and (iv) a flame retardant, and a second polymeric layer including 0 to about 50% of the flame retardant present in the first polymeric layer.

DETAILED DESCRIPTION OF ILLUSTRATIVE EMBODIMENTS

One or more embodiments of the present invention are directed toward membranes. These membranes may include multi-layered membranes that include at least two polymeric layers. The polymeric layers may also be referred to as polymeric sheets. Polymeric layers include a continuous polymeric phase where the polymeric phase is generally compositionally similar throughout the layer. The polymeric layer may also include non-polymeric constituents such as fillers or other additives. The membranes of the present invention may also include other constituents that are not polymeric layers. For example, the membranes may include reinforcing scrims or fabric.

In one or more embodiments, at least one polymeric layer of the membranes of the present invention includes i) a plastomer, ii) a low density polyethylene, and iii) a propylene-based polymer. This polymeric layer, which may be referred to herein as the "at least one polymeric layer," may also include other constituents or ingredients that are conventionally included in polymeric membranes including, but not limited to, stabilizers and fillers. In certain embodiments, particularly where the membrane is a roofing membrane, the at least one polymeric layer also includes a flame retardant.

In one or more embodiments, the plastomer includes an ethylene-α-olefin copolymer. The plastomer employed in one or more embodiments of this invention includes those described in U.S. Pat. Nos. 6,207,754, 6,506,842, 5,226,392, and 5,747,592, which are incorporated herein by reference. This copolymer may include from about 1.0 to about 15 mole percent, in other embodiments from about 2 to about 12, in other embodiments from about 3 to about 9 mole percent, and in other embodiments from about 3.5 to about 8 mole percent mer units deriving from α-olefins, with the balance including mer units deriving from ethylene. The α-olefin employed in preparing the plastomer of one or more embodiments of this invention may include butene-1, pentene-1, hexene-1, octene-1, or 4-methyl-pentene-1.

The plastomer of one or more embodiments of this invention can be characterized by a density of from about 0.865 g/cc to about 0.900 g/cc, in other embodiments from about 0.870 to about 0.890 g/cc, and in other embodiments from about 0.875 to about 0.880 g/cc per ASTM D-792. In these or other embodiments, the density of the plastomers may be less than 0.900 g/cc, in other embodiments less than 0.890 g/cc, in other embodiments less than 0.880 g/cc, and in other embodiments less than 0.875 g/cc.

In one or more embodiments, the plastomer may be characterized by a weight average molecular weight of from about $7\times10^4$ to $13\times10^4$ g/mole, in other embodiments from about $8\times10^4$ to about $12\times10^4$ g/mole, and in other embodiments from about $9\times10^4$ to about $11\times10^4$ g/mole as measured by using GPC with polystyrene standards. In these or other embodiments, the plastomer may be characterized by a weight average molecular weight in excess of $5\times10^4$ g/mole, in other embodiments in excess of $6\times10^4$ g/mole, in other embodiments in excess of $7\times10^4$ g/mole, and in other embodiments in excess of $9 \times 10^4$ g/mole. In these or other embodiments, the plastomer may be characterized by a molecular weight distribution ($M_w/M_n$) that is from about 1.5 to 2.8, in other embodiments 1.7 to 2.4, and in other embodiments 2 to 2.3.

In these or other embodiments, the plastomer may be characterized by a melt index of from about 0.1 to about 8, in other embodiments from about 0.3 to about 7, and in other embodiments from about 0.5 to about 5 per ASTM D-1238 at 190° C. and 2.16 kg load.

The uniformity of the comonomer distribution of the plastomer of one or more embodiments, when expressed as a comonomer distribution breadth index value (CDBI), provides for a CDBI of greater than 60, in other embodiments greater than 80, and in other embodiments greater than 90.

In one or more embodiments, the plastomer may be characterized by a DSC melting point curve that exhibits the occurrence of a single melting point break occurring in the region of 50 to 110° C.

The plastomer of one or more embodiments of this invention may be prepared by using a single-site coordination catalyst including metallocene catalyst, which are conventionally known in the art.

Useful plastomers include those that are commercially available. For example, plastomer can be obtained under the tradename EXXACT™ 8201 (ExxonMobil); or under the tradename ENGAGE™ 8180 (Dow DuPont).

In one or more embodiments, the low density polyethylene includes an ethylene-α-olefin copolymer. In one or more embodiments, the low density polyethylene includes linear low density polyethylene. The linear low density polyethylene employed in one or more embodiments of this invention may be similar to that described in U.S. Pat. No. 5,266,392, which is incorporated herein by reference. This copolymer may include from about 2.5 to about 13 mole percent, and in other embodiments from about 3.5 to about 10 mole percent, mer units deriving from α-olefins, with the balance including mer units deriving from ethylene. The α-olefin included in the linear low density polyethylene of one or more embodiments of this invention may include butene-1, pentene-1, hexene-1, octene-1, or 4-methyl-pentene-1. In one or more embodiments, the linear low density polyethylene is devoid or substantially devoid of propylene mer units (i.e., units deriving from propylene). Substantially devoid refers to that amount or less of propylene mer units that would otherwise have an appreciable impact on the copolymer or the compositions of this invention if present.

The linear low density polyethylene of one or more embodiments of this invention can be characterized by a density of from about 0.885 g/cc to about 0.930 g/cc, in other embodiments from about 0.900 g/cc to about 0.920 g/cc, and in other embodiments from about 0.900 g/cc to about 0.910 g/cc per ASTM D-792.

In one or more embodiments, the linear low density polyethylene may be characterized by a weight average molecular weight of from about $1 \times 10^5$ to about $5 \times 10^5$ g/mole, in other embodiments $2 \times 10^5$ to about $10 \times 10^5$ g/mole, in other embodiments from about $5 \times 10^5$ to about $8 \times 10^5$ g/mole, and in other embodiments from about $6 \times 10^5$ to about $7 \times 10^5$ g/mole as measured by GPC with polystyrene standards. In these or other embodiments, the linear low density polyethylene may be characterized by a molecular weight distribution ($M_w/M_n$) of from about 2.5 to about 25, in other embodiments from about 3 to about 20, and in other embodiments from about 3.5 to about 10. In these or other embodiments, the linear low density polyethylene may be characterized by a melt flow rate of from about 0.2 to about 10 dg/min, in other embodiments from about 0.4 to about 5 dg/min, and in other embodiments from about 0.6 to about 2 dg/min per ASTM D-1238 at 230° C. and 2.16 kg load.

The linear low density polyethylene of one or more embodiments of this invention may be prepared by using a convention Ziegler Natta coordination catalyst system.

Useful linear low density polyethylene includes those that are commercially available. For example, linear low density polyethylene can be obtained under the tradename Dowlex™ 2267G (Dow); or under the tradename DFDA-1010 NT7 (Dow).

In one or more embodiments, a functionalized low density polyethylene resin can be used in addition to or in lieu of the linear low density polyethylene. Functionalized low density polyethylene resins may include from about 1.0 to about 7, in other embodiments from about 2 to about 6, and in other embodiments form about 3 to about 5 mole % mer units that include a functional group. The functional group, which may include a pendant moiety, may include an acid or anhydride group. These acid or anhydride groups may derive from unsaturated carboxylic acids or unsaturated anhydrides. Examples of unsaturated carboxylic acids include citraconic acid, cinnamic acid, methacrylic acid, and itaconic acid. Examples of unsaturated anhydrides include maleic anhydride, citraconic anhydride, and itaconic anhydride. The resin can be functionalized by copolymerizing unsaturated carboxylic acids or unsaturated anhydrides together with other monomer to form the polymer backbone, or the unsaturated carboxylic acids or unsaturated anhydrides can be subsequently grafted to the polymer backbone.

Functionalized low density polyethylene resins are commercially available. For example, they can be obtained under the commercial name FUSABOND™ MB 226D (DuPont).

In one or more embodiments, the propylene-based polymer may include polypropylene homopolymer or copolymers of propylene and a comonomer, where the copolymer includes, on a mole basis, a majority of mer units deriving from propylene. In one or more embodiments, the propylene-based copolymers may include from about 2 to about 6 mole percent, and in other embodiments from about 3 to about 5 mole percent mer units deriving from the comonomer with the remainder including mer units deriving from propylene. In one or more embodiments, the comonomer includes at least one of ethylene and an α-olefin. The α-olefins may include butene-1, pentene-1, hexene-1, oxtene-1, or 4-methyl-pentene-1. In one or more embodiments, the copolymers of propylene and a comonomer may include random copolymers. Random copolymers may include those propylene-based copolymers where the comonomer is randomly distributed across the polymer backbone.

The propylene-based polymers employed in one or more embodiments of this invention may be characterized by a melt flow rate of from about 0.5 to about 15 dg/min, in other embodiments from about 0.7 to about 12 dg/min, in other embodiments from about 1 to about 10 dg/min, and in other embodiments from about 1.5 to about 3 dg/min per ASTM D-1238 at 230° C. and 2.16 kg load. In these or other embodiments, the propylene-based polymers may have a weight average molecular weight ($M_w$) of from about $1 \times 10^5$ to about $5 \times 10^5$ g/mole, in other embodiments from about $2 \times 10^5$ to about $4 \times 10^5$ g/mole, and in other embodiments from about $3 \times 10^5$ to about $4 \times 10^5$ g/mole, as measured by GPC with polystyrene standards. The molecular weight distribution of these propylene-based copolymer may be from about 2.5 to about 4, in other embodiments from about 2.7 to about 3.5, and in other embodiments from about 2.8 to about 3.2.

In one or more embodiments, propylene-based polymers may be characterized by a melt temperature ($T_m$) that is from about 165° C. to about 130° C., in other embodiments from about 160 to about 140° C., and in other embodiments from about 155° C. to about 140° C. In one or more embodiments, particularly where the propylene-based polymer is a copolymer of propylene and a comonomer, the melt temperature may be below 160° C., in other embodiments below 155° C., in other embodiments below 150° C., and in other embodiments below 145° C. In one or more embodiments, they may have a crystallization temperature ($T_c$) of about at least 90° C., in other embodiments at least about 95° C., and in other embodiments at least 100° C., with one embodiment ranging from 105° to 115° C.

Also, these propylene-based polymers may be characterized by having a heat of fusion of at least 25 J/g, in other embodiments in excess of 50 J/g, in other embodiments in excess of 100 J/g, and in other embodiments in excess of 140 J/g.

In one or more embodiments, the propylene-based polymers may be characterized by a flexural modulus, which may also be referred to as a 1% secant modulus, in excess of 120,000 psi, in other embodiments in excess of 125,000, in other embodiments in excess of 130,000 psi, in other embodiments in excess of 133,000 psi, in other embodiments in excess of 135,000 psi, and in other embodiments in excess of 137,000 psi, as measured according to ASTM D-790.

Useful propylene-based polymers include those that are commercially available. For example, propylene-based polymers can be obtained under the tradename PP7620Z™ (Fina), PP33BF01™ (Equistar), or under the tradename TR3020™ (Sunoco).

Flame retardants may include any compound that will increase the burn resistivity of the membranes of the present invention or at least one layer thereof. In one or more embodiments, the flame retardant may include halogenated flame retardants, non-halogenated flame retardants, or mixtures thereof. Examples of halogenated flame retardants may include halogenated organic species or hydrocarbons such as hexabromocyclododecane or N,N'-ethylene-bis-(tetrabromophthalimide). Hexabromocyclododecane is commercially available under the tradename CD-75P™ (ChemTura). N,N'-ethylene-bis-(tetrabromophthalimide) is commercially available under the tradename Saytex™ BT-93 (Albemarle). Exemplary non-halogenated flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), which is sold together as a polyol masterbatch, melamine polyphosphate is available under the tradename Budit™ 3141 (Budenheim), and antimony oxide ($Sb_2O_3$) is commercially available under the tradename Fireshield™.

In one or more embodiments, treated or functionalized magnesium hydroxide may be employed. For example, magnesium oxide treated with or reacted with a carboxylic acid may be employed. In one embodiment, the magnesium hydroxide may be treated or reacted with stearic acid. In other embodiments, the magnesium hydroxide may be treated with or reacted with certain silicon-containing compounds. The silicon-containing compounds may include silanes, polysiloxanes including silane reactive groups. Treated magnesium hydroxide is commercially available. For example, Zerogen™ 50.

In one or more embodiments, the at least one polymeric layer includes a stabilizers. Stabilizers may include one or more of a UV stabilizer, an antioxidant, and an antiozonant. UV stabilizers include Tinuvin™ 622. Antioxidants include Irganox™ 1010.

In addition to the foregoing, the at least one polymeric layer may also include other ingredients or constituents that are commonly included in polymeric compounds. These ingredients may include pigment such as $TiO_2$. In certain embodiments, especially where the membrane is employed as a geomembrane, carbon black may be employed as a pigment or reinforcement.

In one or more embodiments, the at least one polymeric layer may include from about 5 to about 50% by weight, in other embodiments from about 10 to about 45% by weight, and in other embodiments from about 15 to about 38% by weight plastomer, based upon the total weight of the polymeric component of the polymeric layer, where the polymeric component refers to all polymeric constituents of the layer, (e.g., plastomer, low density polyethylene, and propylene-based polymer). In these or other embodiments, the polymeric layer may include at least 5% by weight, in other embodiments at least 10% by weight, and in other embodiments at least 15% by weight plastomer, based upon the total weight of the polymeric component of the polymeric layer; in these or other embodiments, the polymeric layer may include less than 50% by weight, in other embodiments less than 45% by weight, and in other embodiments less than 38% by weight plastomer based upon the total weight of the polymeric component of the polymeric layer. In one or more embodiments, the polymeric layer of the membranes of this invention includes sufficient plastomer so as to be flexible at −40° C. In one or more embodiments, the layer includes sufficient plastomer so as to pass the brittle-point test of ASTM D-2137.

In one or more embodiments, the at least one polymeric layer of the membranes of this invention may include from about 10 to about 90% by weight, in other embodiments from about 15 to about 85% by weight, and in other embodiments from about 25 to about 75% by weight low density polyethylene, based upon the total weight of the polymeric component of the polymeric layer. In these or other embodiments, the polymeric layer may include at least 31% by weight, in other embodiments at least 33% by weight, in other embodiments at least 35% by weight, and in other embodiments at least 40% by weight low density polyethylene (e.g., linear low density polyethylene), based upon the total weight of the polymeric component of the polymeric layer; in these or other embodiments, the polymeric layer may include less than 90% by weight, and in other embodiments less than 75% by weight low density polyethylene based upon the total weight of the polymeric component of the polymeric layer. In one or more embodiments, the at least one layer of the membranes of this invention include sufficient low density polyethylene so as to provide high tensile and tear. In one or more embodiments, the layer includes sufficient low density polyethylene to provide elongation of at least 500% (ASTM D-412) and a Die-C tear of at least 525 newtons/cm per ASTM D-624.

In one or more embodiments, the at least one layer of the membranes of this invention may include from about 5 to about 50% by weight, in other embodiments from about 10 to about 45% by weight, and in other embodiments from about 15 to about 35% by weight propylene-based polymer, based upon the total weight of the polymeric component of the polymeric layer. In these or other embodiments, the at least one polymeric layer may include at least 5% by weight, in other embodiments at least 10% by weight, and in other embodiments at least 15% by weight propylene-based polymer, based upon the total weight of the polymeric component of the polymeric layer; in these or other embodiments, the polymeric layer may include less than 50%, in other embodiments less than 49% by weight, and in other embodiments less than 45% by weight propylene-based polymer based upon the total weight of the polymeric component of the polymeric layer. In one or more embodiments, the at least one polymeric layer of the membranes of this invention include sufficient propylene polymer so as to withstand 116° C. aging for 7 days, where membranes or layers that do not withstand these conditions will flow or deform.

In those embodiments where magnesium hydroxide is employed as a flame retardant, the at least one polymeric layer of the membranes of this invention may include from about 5 to about 60% by weight, in other embodiments 10 to about 50% by weight, in other embodiments from about 15 to about 45% by weight, in other embodiments from about 18 to about 40% by weight, and in other embodiments from about 20 to about 38% by weight magnesium hydroxide, based upon the total weight of the polymeric layer, where total weight of the polymeric layer includes the polymeric component and all non-polymeric constituents (e.g., flame retardant). In these or other embodiments, the polymeric layer may include at least 10% by weight, in other embodiments at least 15% by weight, and in other embodiments at least 20% by weight magnesium hydroxide, based upon the total weight of the polymeric layer; in these or other embodiments the polymeric layer may include less than 60% by weight, in other embodiments less than 50% by weight, in other embodiments less than 45% by weight, in other embodiments less than 40%, and in other embodiments less than 38% by weight magnesium hydroxide based upon the total weight of the polymeric layer. In one or more embodiments, the at least one polymeric layer of the membranes of this invention include sufficient magnesium hydroxide so as to pass the UL 790 spread flame test.

In those embodiments where aluminum trihydrate is employed as the flame retardant, the at least one polymeric layer of the membranes of this invention may include from about 10 to about 50% by weight, in other embodiments from about 15 to about 45% by weight, and in other embodiments from about 20 to about 38% by weight aluminum trihydrate, based upon the total weight of the polymeric layer. In these or other embodiments, the at least one polymeric layer may include at least 10% by weight, in other embodiments at least 15% by weight, and in other embodiments at least 20% by weight, based upon the total weight of the polymeric layer; in these or other embodiments, the at least one polymeric layer may include less than 50% by weight, in other embodiments less than 45% by weight, and in other embodiments less than 38% by weight aluminum trihydrate based upon the total weight of the polymeric layer. In one or more embodiments, the at least one polymeric layer of the membranes of this invention include sufficient aluminum trihydrate so as to pass the UL 790 spread flame test.

In those embodiments where a halogenated hydrocarbon is employed as a flame retardant, the at least one polymeric layer of the membranes of this invention may include from about 10 to about 50% by weight, in other embodiments from about 15 to about 45% by weight, in other embodiments from about 16 to about 40% by weight, in other embodiments from about 20 to about 38% by weight, and in other embodiments from about 20 to about 35% by weight halogenated hydrocarbon, based upon the total weight of the polymeric layer; in these or other embodiments, the at least one polymeric layer may include at least 10% by weight, in other embodiments at least 15% by weight, and in other embodiments at least 20% by weight, based upon the total weight of the polymeric layer; in these or other embodiments, the at least one polymeric layer may include less than 50% by weight, in other embodiments less than 45% by weight, and in other embodiments less than 38% by weight halogenated hydrocarbon, based on total weight of the sheet.

In one or more embodiments, the at least one polymeric layer of the membranes of this invention include sufficient flame retardant so as to pass the UL 790 spread flame test. In those embodiments where the membrane is employed as a geomembrane, the polymeric sheet may include from about 0 to about 50% by weight retardant; in other words, flame retardant may be optional.

In one or more embodiments, the at least one polymeric layer of the membranes of this invention may include from about 0.1 to about 5% by weight, in other embodiments from about 0.5 to about 4% by weight, and in other embodiments from about 1 to about 3% by weight stabilizer, based upon the total weight of the polymeric sheet. In one or more embodiments, the at least one polymeric layer of the membranes of this invention include sufficient stabilizer so as to pass 10,000 hr Xenon Arc cycle test (ASTM G-155).

In one or more embodiments, the at least one polymeric layer includes less than 10% by weight, in other embodiments less than 5% by weight, in other embodiments less than 2% by weight, and in other embodiments less than 1% by weight gel. In these or other embodiments, the at least one polymeric layer is substantially devoid of gel, which refers to an amount that is less than that amount that would have an appreciable impact on the polymeric sheet. In one or more embodiments, the at least one polymeric layer is devoid of gel. In these or other embodiments, gel refers to polymer that is insoluble in cyclohexane at room temperature or boiling xylene. In these or other embodiments, gel refers to cured or crosslinked polymer.

In one or more embodiments, the at least one polymeric layer includes less than 10% by weight, in other embodiments less than 5% by weight, in other embodiments less than 2% by weight, and in other embodiments less than 1% by weight rubber based upon the total weight of the layer. In these or other embodiments, the polymeric sheet is substantially devoid of rubber, which refers to an amount that is less than that amount that would have an appreciable impact on the polymeric sheet. In certain embodiments, the polymeric sheet is devoid of rubber. In one or more embodiments, a rubber may include a polymer or polymeric compound having a glass transition temperature that is less than 10° C., in other embodiments less than 0° C., in other embodiments less than −10° C., and in other embodiments less than −20° C. In these or other embodiments, rubbers include those polymers or polymeric compounds that will not crystallize. In these or other embodiments, rubbers include those polymers or polymeric compounds that exhibit less than 10% by weight, in other embodiments less than 5% by weight, in other embodiments less than 2% by weight, in other embodiments less than 1% by weight, and in other embodiments less than 0.5% by weight crystallinity. Exemplary rubber polymers include ethylene-propylene rubber (e.g., propylene content in excess of 30%), ethylene-propylene-diene rubber, isobutylene-param-ethylstyrene copolymer, and brominated isobutylene-param-ethylstyrene copolymer.

As described above, the membranes of one or more embodiments of the present invention include at least one polymeric layer. In certain embodiments, the membrane may include two or more polymeric layers. A membrane according to one or more embodiments of the present invention can be described with reference to FIG. 1. Membrane 10 includes first polymeric layer 12, second polymeric layer 14, and reinforcing scrim 16. Either of or both polymeric layers 12 and 14 may include constituents as defined above (i.e., the plastomer (i), the low density polyethylene (ii), and the propylene-based polymer (iii)). In those instances where only one of polymeric layer 12 or polymeric layer 14 includes constituents as defined above, the positioning of that layer (i.e., either above or below reinforcing scrim 16) can vary. In other words, the polymeric layer including the constituents defined above may be positioned above reinforcing layer 16, or it may be positioned below reinforcing scrim 16.

Adjacent sheets may be integral with one another. For example, the layers may be positioned so as to form a laminate with each layer forming a layer of the laminate.

Figure 1:
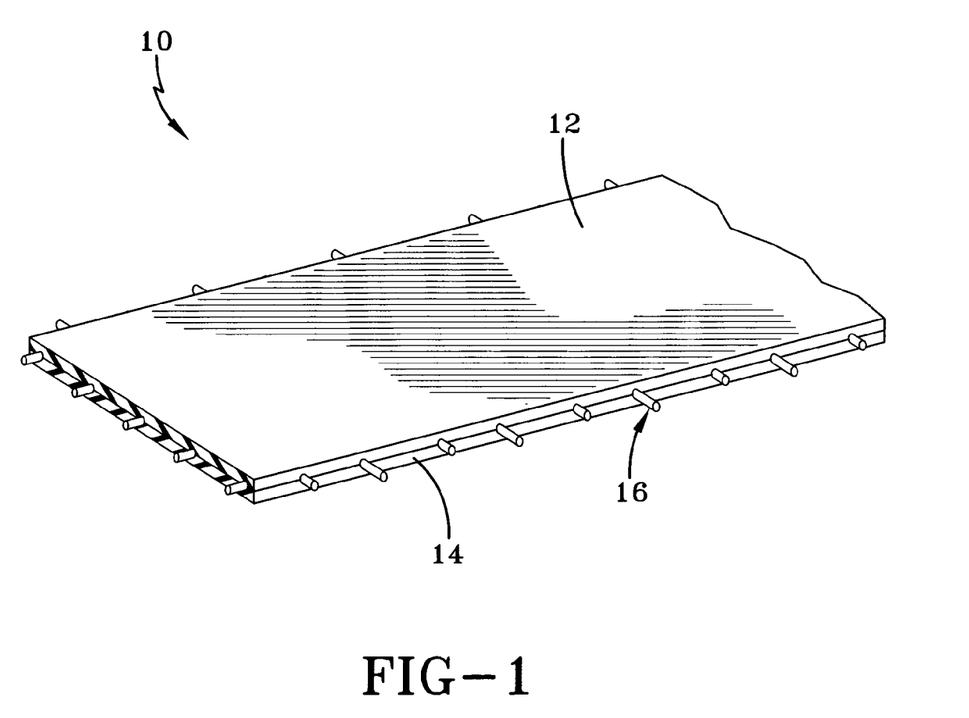
FIG. 1 is a perspective cross-sectional view of a membrane according to one or more embodiments of the invention where portion of the membrane are cut away to show cross section.
Figure 2:
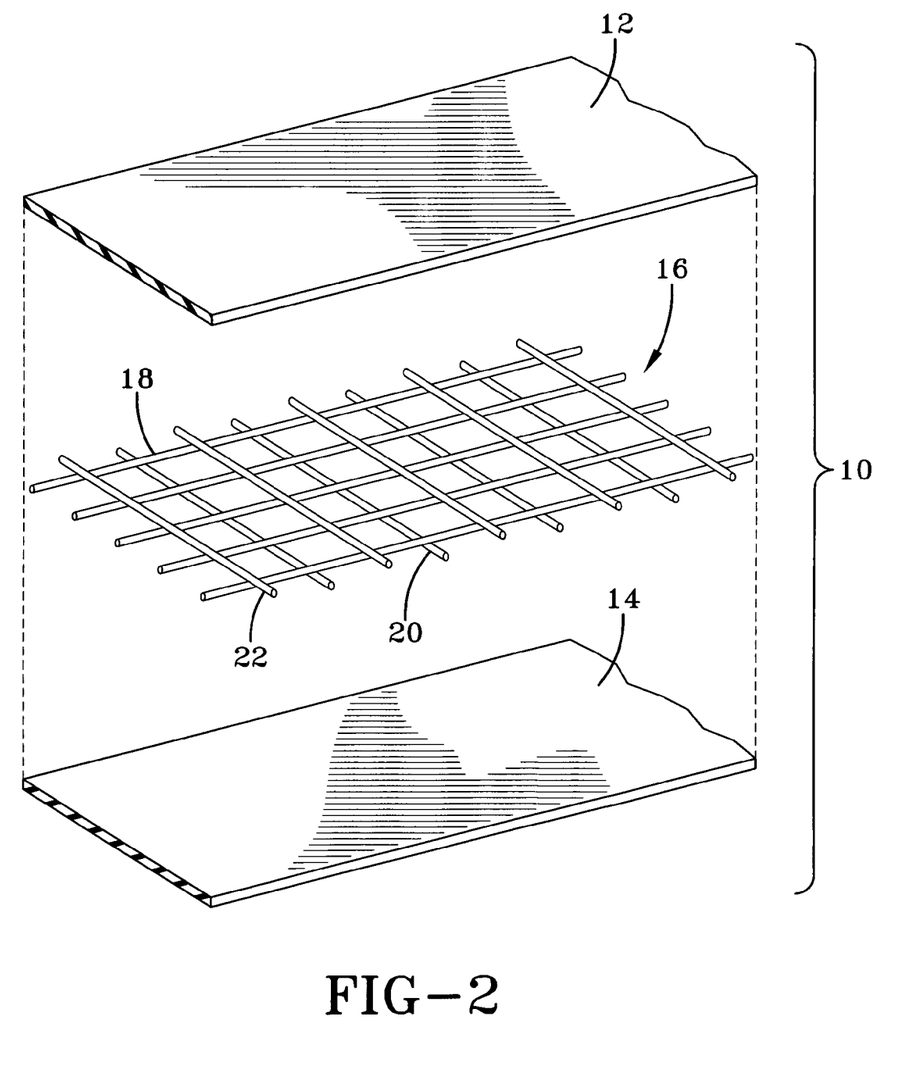
FIG. 2 is a perspective view of a membrane according to one or more embodiments of the invention where the various components of the membrane are shown in exploded view.

In those embodiments where the membranes include multiple layers, the various polymeric layers of the laminate may be the same (e.g., compositionally similar) or they may be distinct. In one or more embodiments, the additional polymeric layers (i.e., those layers in the addition to the at least one layer described above), may include polymeric materials or blends that are conventional in the art or that are not necessarily defined herein. In other embodiments, each polymeric sheet of the membranes may be defined herein. In certain embodiments, polymeric layer 12 includes constituents as defined herein together with flame retardant as defined herein. In these or other embodiments, polymeric layer 14 is compositionally similar except layer 14 is devoid or substantially devoid of flame retardant. In other embodiments, layer 14 is compositionally similar to layer 12 except that layer 14 includes from 0 to 60%, in other embodiments 1 to 50%, and in other embodiments 2 to 40% of the flame retardant employed in polymeric layer 12.

In one or more embodiments, the membranes of the present invention may also optionally include a layer or component that is not a polymeric layer. For example, a reinforcing scrim or fabric may be included. Examples of reinforcing scrims include woven and non-woven scrims, directional and non-directional scrims, and orthogonal and non-orthogonal scrims. Scrims may include a plurality of yarns oriented in the machine direction, or along the length of the scrim, and a plurality of yarns oriented in the cross-machine direction, or across the width of the scrim. These yarns may be referred to as the warp yarns and weft yarns, respectively. Practice of the invention is not necessarily limited by the type of yarn employed in the fabric or scrim. Exemplary yarns include polyolefin, polyester, polyaramide yarns, and mixtures thereof. Other useful yarns include fiberglass yarns. In one or more embodiments, useful scrims may include two or more distinct yarns (e.g., both polyester and fiberglass yarns).

In one embodiment, as shown in FIG. 1, includes a non-woven directional scrim. This particular scrim includes three distinct layers of yarns that are positioned with the warp yarns 20 and 22 alternating above and below the plane of weft yearns 18. In one or more embodiments, warp yarns 20 and 22 extend longitudinally along the length of membrane 10, and weft yarns 18 extend laterally across membrane 10. Warp yarns 20 and 22 can be adhered to weft yarn 18 by using conventional binders such as crosslinkable acrylic resins.

In one or more embodiments, the number of warp and weft yarns can include from about 1 to about 20 yarns in the machine direction and from about 1 to about 20 yarns in the cross-machine direction per square inch, in other embodiments from about 5 to about 15 yarns in the machine direction and from about 5 to 15 yarns in the cross machine direction per square inch, and in other embodiments from about 8 to 12 yarns in the machine direction and from about 8 to 12 yarns in the cross machine direction per square inch. In one particular embodiment, the reinforcing scrim may include a 9×9 1,000 denier scrim that is weft inserted.

In one or more embodiments, where membrane 10 may be employed as a roofing membrane, the thickness of the polymeric layers 12 and 14, which each may have distinct thicknesses, may be from about 380 to about 760 µm (15 to about 30 mil), in other embodiments from about 450 to about 630 µm, and in other embodiments from about 480 to about 610 µm. In these or other embodiments, the overall thickness of membrane 10 may be from about 890 to about 2,300 µm, in other embodiments from about 1,000 to about 2,000 µm, and in other embodiments from about 1,200 to about 1,900 µm.

In one or more embodiments, where the membrane may be employed as a geomembrane membrane, the thickness of the polymeric layers 12 and 14, which each may have distinct thicknesses, may be from about 200 to about 2,500 µm, in other embodiments from about 380 to about 2,100 µm, and in other embodiments from about 630 to about 1,900 µm. In these or other embodiments, the overall thickness of membrane 10 may be from about 500 to about 3,550 µm, in other embodiments from about 1,000 to about 3,000 µm, and in other embodiments from about 1,500 to about 2,500 µm.

Figure 4:
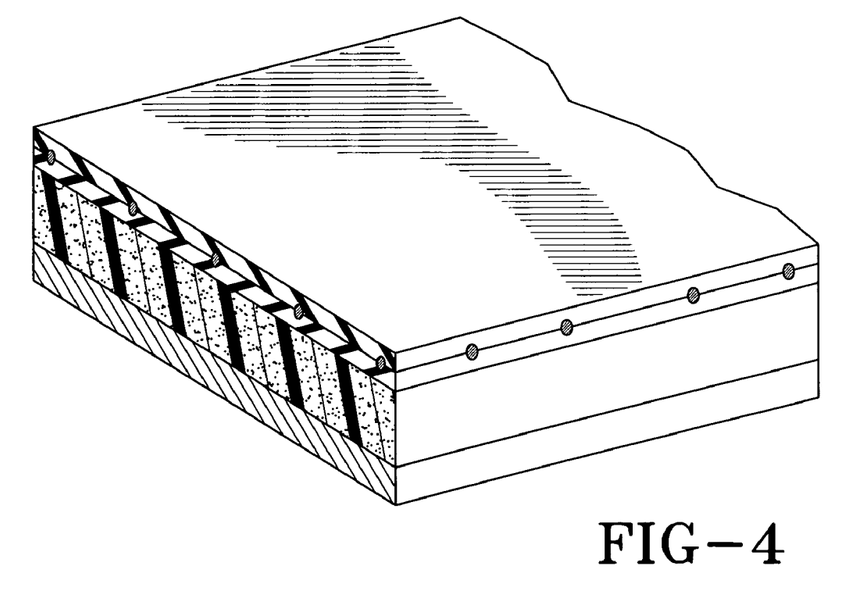
FIG. 4 is a perspective view of a built-up roof with various portions cut away to show cross section.

In other embodiments, certain membranes of the present invention can be described with reference to FIG. 4, which shows a membrane including four polymeric layers. Specifically, membrane 20 include first polymeric layer 22, second polymeric layer 24, third polymeric layer 26, fourth polymeric layer 28, and scrim 16. In one or more embodiments, first layer 22 includes constituents consistent with the description of the at least one layer described herein (i.e., plastomer (i), low density polyethylene (ii), and propylene-based polymer (iii)). In particular embodiments, first layer 22 includes flame retardant as described herein. Fourth layer 28 may be compositionally similar to first layer 22. In certain embodiments, fourth layer 28 includes flame retardant as described herein. In other embodiments, fourth layer 28 does not include flame retardant or is substantially devoid thereof.

In certain embodiments, second layer 24 and third layer 26 are compositionally similar. In certain embodiments, these layers include a blend of low density polyethylene and propylene-based polymer. In these or other embodiments, these layers may include various fillers such as organic and inorganic fillers. In these or other embodiments, second layer 24 and third layer 26 may be devoid or substantially devoid of plastomer. Also, in these or other embodiments, second layer 24 and third layer 26 may be devoid or substantially devoid of flame retardant. Where second layer 24 and third layer 26 are compositionally the same, and depending upon the method by which the membrane is formed, second layer 24 and third layer 26 may, in certain embodiments, form a single integral layer in which scrim 18 is embedded.

In one or more embodiments, membrane 20 may be configured to achieve certain performance characteristics. For example, in one or more embodiments, layer 22 may include sufficient flame retardant so that the overall membrane can pass the UL 790 flame spread test. In other embodiments, first layer 22 and fourth layer 28 include sufficient flame retardant so as to pass the UL 790 flame spread test.

In one or more embodiments, the thickness of first layer 22 may be from about 175 to about 380 µm, in other embodiments from about 200 to about 360 µm, in other embodiments from about 230 to about 330 µm, and in other embodiments from about 250 to about 300 µm. Second layer 24, third layer 26, and fourth layer 28 may have similar thicknesses.

In one or more embodiments, the membranes of the present invention may be prepared by extruding a polymeric composition into a sheet. Multiple sheets may be extruded and joined to form a laminate. A membrane including a reinforcing layer may be prepared by extruding at least one sheet on and/or below a reinforcement (e.g., a scrim). In other embodiments, the polymeric layer may be prepared as separate sheets, and the sheets may then be calandered with the scrim sandwiched therebetween to form a laminate. In one or more embodiments, the membranes of the present invention are prepared by employing co-extrusion technology. Useful techniques include those described in co-pending U.S. Ser. No. 60/775,128, which is incorporated herein by reference.

Following extrusion, and after optionally joining one or more polymeric sheets, or optionally joining one or more polymeric sheets together with a reinforcement, the membrane may be fabricated to a desired thickness. This may be accomplished by passing the membrane through a set of squeeze rolls positioned at a desired thickness. The membrane may then be allowed to cool and/or rolled for shipment and/or storage.

The polymeric composition that may be extruded to form the polymeric sheet may include the ingredients or constituents described herein. For example, the polymeric composition may include plastomer, low density polyethylene, propylene polymer, and optionally flame retardant. The ingredients may be mixed together by employing conventional polymer mixing equipment and techniques. In one or more embodiments, an extruder may be employed to mix the ingredients. For example, single-screw or twin-screw extruders may be employed.

In one embodiment, each of the polymeric ingredients (e.g., plastomer, low density polyethylene, and propylene polymer) may be added to the extruder at the feed throat of the extruder. The filler and other ingredients that may be desirable may be added at the feed throat or within a subsequent stage or barrel of the extruder (e.g., downstream of the feed throat). This can be accomplished, for example, by using a side feeder. One or more of the polymeric ingredients may also be added downstream of the feed throat. This may include partial addition at the feed throat and partial addition downstream, or complete downstream addition of one or more polymeric ingredients.

In one or more embodiments, at least a portion of the flame retardant (e.g., magnesium hydroxide) is added downstream of the feed throat. For example, at least 50% by weight, in other embodiments at least 75% by weight, in other embodiments at least 95% by weight, and in other embodiments at least 100% by weight of the flame retardant is added downstream of the feed throat.

In one or more embodiments, the flame retardant (e.g., magnesium hydroxide) may be added downstream of the feed throat together with a carrier. The carrier may include a polymer having a melt flow rate in excess of about 10, in other embodiments in excess of about 5, and in other embodiments in excess of about 2. In one or more embodiments, the carrier may advantageously include one or more of the polymeric ingredients of the polymeric sheet.

The membranes of one or more embodiments of the present invention are useful in a number of applications. In one embodiment, the membranes may be useful for roofing membranes that are useful for covering flat or low-sloped roofs. In other embodiments, the membranes may be useful as geomembranes. Geomembranes include those employed as pond liners, water dams, animal waste treatment liners, and pond covers. In order to demonstrate the practice of the present invention, the following examples have been prepared and tested. The examples should not, however, be viewed as limiting the scope of the invention. The claims will serve to define the invention.

Figure 3:
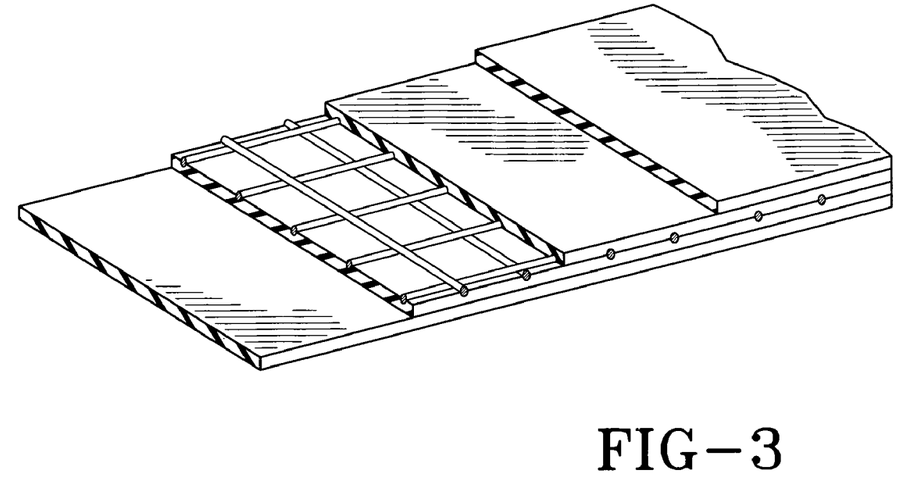
FIG. 3 is a perspective view of a multi-layered membrane where portions of the various layers are cut away to show constituents of the underlying layers.

As described above, the membranes of one or more embodiments of the present invention may be employed as roofing membranes. These membranes include thermoplastic roofing membranes including those that meet the specifications of ASTM D-6878-03. These membranes maybe employed to cover flat or low/sloped roofs including built-up roofs. As shown in FIG. 3, a flat or low-sloped built-up roof 30 may include a roof deck 32, and optional insulation layer 34, and membrane 10.

Practice of this invention is not limited by the selection of any particular roof deck. Accordingly, the roofing systems herein can include a variety of roof decks. Exemplary roof decks include concrete pads, steel decks, wood beams, and foamed concrete decks.

Practice of this invention is likewise not limited by the selection of any particular insulation board. Moreover, the insulation boards are optional. Several insulation materials can be employed including polyurethane or polyisocyanurate cellular materials. These boards are known as described in U.S. Pat. Nos. 6,117,375, 6,044,604, 5,891,563, 5,573,092, U.S. Publication Nos. 2004/01099832003/0082365, 2003/0153656, 2003/0032351, and 2002/0013379, as well as U.S. Ser. Nos. 10/640,895, 10/925,654, and 10/632,343, which is incorporated herein by reference.

In other embodiments, these membranes may be employed to cover flat or low-slope roofs following a re-roofing event. In one or more embodiments, the membranes may be employed for re-roofing as described in U.S. Publication No. 2006/0179749, which are incorporated herein by reference.

EXAMPLES

Prophetic Example

At least one component of a thermoplastic membrane can be prepared as follows. The recipe set forth in Table I can be employed in preparing the membrane. Table I provides the ingredients, the amount of the ingredient employed in the recipe, and the commercial source of the ingredient.

TABLE I

| Ingredient | Parts by Weight | Commercial Source |
|---|---|---|
| LLDPE | 30 | LX ™ 177 (Huntsman) |
| m-PE | 18.5 | Engage ™ 8180 (Dow) |
| PP-random | 12.5 | TR ™ 3020F (Sunoco) |
| AO | 0.15 | Mayzo ™ BNX 1225 (Mayzo) |
| AO | 0.15 | Mayzo ™ BNX 1900 Mayzo) |
| UV | 0.15 | Mayzo ™ BLS 1770 (Mayzo) |
| UV | 0.1 | Ciba ™ EB 40-70 (Ciba) |
| Antiblock | 0.3 | Struktol ™ TR016 (Struktol) |
| TiO$_2$ | 4.8 | Kronos ™ 2160 (Kronos) |
| Mag | 32 | Vertex ™ St (J. M. Huber) |
| Talc | 1.35 | Microtuff ™ AG609-D (Specialty Minerals) |

The foregoing ingredients can be mixed within a twin screw extruder or a Farrel™ continuous mixer. The mixer can be operated at a temperature up to about 450° to about 470° F. In the case of a twin-crew extruder, the temperature may be ramped up across sequential barrels so as to reach a final barrel temperature of about 450-470° F. The residence time of mixing may be from about 5 to about 10 minutes. Where a Farrel™ continuous mixer is employed, all ingredients can be added at one interval, and the sequence of addition may not be critical. Where a twin-screw extruder is employed, addition of the various ingredients can occur simultaneously or sequentially by employing side feeders.

Once the ingredients have been mixed, the polymeric composition can be pelletized for transport and/or storage.

The foregoing composition can be extruded into sheets by employing conventional single-screw extruders. The various components (e.g., various polymeric sheets) of the membrane can be co-extruded and contacted with the reinforcement layer to provide the membranes.

Various modifications and alterations that do not depart from the scope and spirit of this invention will become apparent to those skilled in the art. This invention is not to be duly limited to the illustrative embodiments set forth herein.

What is claimed is:

1. A multi-layered membrane comprising:
   a first polymeric layer including (i) a plastomer, (ii) a low density polyethylene, (iii) a propylene-based polymer, and (iv) a flame retardant; and
   a second polymeric layer, wherein the second polymeric layer optionally includes from 0 to about 50% of the flame retardant present in the first polymeric layer.

2. The membrane of claim 1, where the plastomer includes an ethylene-α-olefin copolymer characterized by a density of from about 0.865 g/cc to about 0.900 g/cc.

3. The membrane of claim 1, where the low-density polyethylene includes linear low density polyethylene.

4. The membrane of claim 3, where the linear low density polyethylene includes an ethylene-α-olefin copolymer including from about 2.5 to about 13 mole percent mer units deriving from α-olefins.

5. The membrane of claim 4, where the linear low density polyethylene is characterized by a density of from about 0.885 g/cc to about 0.930 g/cc per ASTM D-792.

6. The membrane of claim 1, where the propylene-based polymer includes propylene homopolymer or copolymers with propylene and a comonomer, and where the copolymer includes, on a mole basis, a majority of mer units deriving from propylene.

7. The membrane of claim 6, where the propylene-based copolymers include from about 2 to about 6 mole percent mer units deriving from comonomer, with the balance including mer units deriving from propylene.

8. The membrane of claim 1, where the flame retardant is selected from the group consisting of halogenated flame retardants, non-halogenated flame retardants, and mixtures thereof.

9. The membrane of claim 8, where the halogenated flame retardants include halogenated hydrocarbons, where the halogenated hydrocarbons include hexabromocyclododecane, N,N'-ethylene-bis-(tetrabromophthalimide), and mixtures thereof, and where the non-halogenated flame retardants include magnesium hydroxide, aluminum trihydrate, zinc borate, ammonium polyphosphate, melamine polyphosphate, and mixtures thereof.

10. The membrane of claim 9, where the magnesium hydroxide includes a treated magnesium hydroxide or a functionalized magnesium hydroxide.

11. The membrane of claim 10, where the magnesium hydroxide includes magnesium oxide treated with or reacted with a carboxylic acid, or where the magnesium hydroxide includes that treated or reacted with stearic acid, or where the magnesium hydroxide includes that treated or reacted with silicon-containing compounds selected from the group including silanes, and polysiloxanes, or where the magnesium hydroxide includes magnesium hydroxide treated with titanates.

12. The membrane of claim 1, where the first polymeric layer includes i) from about 5 to about 50% by weight plastomer, ii) from about 10 to about 90% by weight low density polyethylene, and iii) from about 5 to about 50% by weight propylene-based polymer based upon the total weight of the plastomer, low density polyethylene, and propylene-based polymer, and also includes iv) from about 10 to about 50% by weight magnesium hydroxide, based upon the total weight of the at least one layer.

13. The membrane of claim 12, where the first polymeric layer includes i) from about 10 to about 45% by weight plastomer, ii) from about 15 to about 85% by weight low density polyethylene, and iii) from about 10 to about 45% by weight propylene-based polymer based upon the total weight of the plastomer, low density polyethylene, and propylene-based polymer, and also includes iv) from about 15 to about 45% by weight magnesium hydroxide, based upon the total weight of the at least one layer.

14. The membrane of claim 1, where the membrane includes a scrim positioned between said first and second layers.

15. The membrane of claim 1, where the gel content of the first layer is less than 10 weight percent of the sheet.

16. The membrane of claim 1, where the propylene-based polymer is characterized by 1% secant modulus in excess of 120,000 psi.

17. The membrane of claim 7, where the propylene-based polymer is characterized by 1% secant modulus in excess of 137,000 psi.

18. The membrane of claim 1, where the first layer includes less than 10 weight percent rubber.

19. The membrane of claim 1, where the first layer is substantially devoid of rubber.

20. The membrane of claim 1, where the first layer includes at least 31% by weight low density polyethylene based upon the total weight of the plastomer, low density polyethylene, and propylene-based polymer.

21. The membrane of claim 20, where the at least one layer includes at least 35% by weight low density polyethylene.

22. A membrane comprising:
    at least one polymeric layer including (i) a plastomer, (ii) a low density polyethylene, and (iii) a propylene-based polymer, where the polymeric sheet includes at least 31% by weight of the low density polyethylene based upon the total weight of the plastomer, low density polyethylene, and propylene-based polymer.

23. A membrane comprising:
    at least one polymeric layer including (i) a plastomer, (ii) a low density polyethylene, and (iii) a propylene-based polymer, where the polymeric sheet is substantially devoid of a rubber.

24. A membrane comprising:
    at least one polymeric layer including (i) a plastomer, (ii) a low density polyethylene, and (iii) a propylene-based polymer, where the low density polyethylene includes a linear low density polyethylene including one or more mer units deriving from butane-1, pentene-1, hexane-1, octane-1, or 4-methyl-pentene-1.

25. A membrane comprising:
    at least one polymeric layer including i) a plastomer, ii) a low density polyethylene, iii) a propylene-based polymer, and optionally iv) flame retardant.

26. The membrane of claim 1, further comprising a scrim positioned between the first and second polymeric layers.

* * * * *